United States Patent
Woon et al.

(10) Patent No.: US 7,899,598 B2
(45) Date of Patent: Mar. 1, 2011

(54) METHOD FOR CONTROLLING A SURFACE-MODIFYING MACHINE

(75) Inventors: Clement Woon, Heerbrugg (CH); Peter A. Stegmaier, Uetikon a/S (CH); Klaus Schneider, Dornbirn (AT); Martin Nix, Rebstein (CH)

(73) Assignee: Leica Geosystems AG, Heerbrugg (CH)

( * ) Notice: Subject to any disclaimer, the term of this patent is extended or adjusted under 35 U.S.C. 154(b) by 883 days.

(21) Appl. No.: 11/569,556

(22) PCT Filed: May 24, 2005

(86) PCT No.: PCT/EP2005/005595

§ 371 (c)(1),
(2), (4) Date: Feb. 16, 2007

(87) PCT Pub. No.: WO2005/116348

PCT Pub. Date: Aug. 12, 2005

(65) Prior Publication Data

US 2007/0214687 A1    Sep. 20, 2007

(30) Foreign Application Priority Data

May 24, 2004   (EP)   ................... 04012226

(51) Int. Cl.
*G06F 19/00* (2006.01)
(52) U.S. Cl. ................. 701/50; 701/1; 701/3; 701/208; 701/213; 37/348; 37/415; 172/1; 342/64; 342/457

(58) Field of Classification Search ....................... None
See application file for complete search history.

(56) References Cited

U.S. PATENT DOCUMENTS 3,805,261 A * 4/1974 Deschamps et al. ........... 342/64

(Continued)

FOREIGN PATENT DOCUMENTS

DE          197 43 534 A1    6/1998

(Continued)

OTHER PUBLICATIONS

Philip Greenspun "Site controller: A system for computer-aided civil engineering and construction" Feb. 1993, M.I.T. Cambridge, AITR-1408, XP002308289 [Online:URL:ftp://publications.ai.mit.edu/ai-publications/pdf/AITR-140.pdf] Retrieved Nov. 26, 2004. pp. 43-81.

(Continued)

*Primary Examiner*—Khoi Tran
*Assistant Examiner*—Jonathan L Sample
(74) *Attorney, Agent, or Firm*—Workman Nydegger (57) ABSTRACT

The invention relates to a method for controlling a surface-modifying machine, wherein information on the desired condition and on the actual condition of ground to be prepared is provided and is used to derive control statements for the machine based on a comparison of the desired and the actual condition. The information on the actual condition is represented by a point cloud as a spatial distribution of discrete surface points. In order to derive control statements, at least two surface points each from the point cloud are used for every horizontal position so that non-differentiated information can be derived that for example also allow to identify various planes.

32 Claims, 6 Drawing Sheets

U.S. PATENT DOCUMENTS

| | | | | |
|---|---|---|---|---|
| 5,404,661 | A * | 4/1995 | Sahm et al. | 37/348 |
| 5,471,391 | A * | 11/1995 | Gudat et al. | 701/50 |
| 5,631,658 | A * | 5/1997 | Gudat et al. | 342/457 |
| 5,646,844 | A * | 7/1997 | Gudat et al. | 701/208 |
| 5,987,383 | A * | 11/1999 | Keller et al. | 701/213 |
| 5,988,862 | A * | 11/1999 | Kacyra et al. | 703/6 |
| 6,016,118 | A * | 1/2000 | Jackson et al. | 342/357.29 |
| 6,047,227 | A * | 4/2000 | Henderson et al. | 701/50 |
| 6,073,068 | A * | 6/2000 | Koehrsen | 701/50 |
| 6,191,732 | B1 * | 2/2001 | Carlson et al. | 342/357.06 |
| 6,608,913 | B1 * | 8/2003 | Hinton et al. | 382/104 |
| 6,619,406 | B1 * | 9/2003 | Kacyra et al. | 172/4.5 |
| 6,711,475 | B2 * | 3/2004 | Murphy | 701/3 |
| 6,725,142 | B2 * | 4/2004 | Koch | 701/50 |
| 6,781,683 | B2 * | 8/2004 | Kacyra et al. | 356/141.1 |
| 7,023,432 | B2 * | 4/2006 | Fletcher et al. | 345/419 |
| 7,372,558 | B2 * | 5/2008 | Kaufman et al. | 356/237.2 |
| 2002/0138228 | A1 * | 9/2002 | Faulkner et al. | 702/138 |
| 2002/0161469 | A1 * | 10/2002 | Faulkner et al. | 700/118 |
| 2003/0004645 | A1 * | 1/2003 | Kochi | 702/1 |
| 2003/0121673 | A1 * | 7/2003 | Kacyra et al. | 172/1 |
| 2004/0189944 | A1 * | 9/2004 | Kaufman et al. | 352/10 |
| 2005/0001763 | A1 * | 1/2005 | Han et al. | 342/357.04 |
| 2005/0197773 | A1 * | 9/2005 | Brewster et al. | 702/2 |

FOREIGN PATENT DOCUMENTS

| | | |
|---|---|---|
| WO | 97/40342 | 10/1997 |
| WO | 01/04576 A1 | 1/2001 |

OTHER PUBLICATIONS

Cees De Keizer, et al. "A New Generation DP/DT System for Dredging Vessels" Dynamic Positioning Conference, Oct. 18, 2000, Houston XP002306423.

Christoph Witzgall, et al, "TIN Techniques for data analyses and surface construction; NISTIR 7078" Jan. 2004, National Institute of Standards and Technology, Gaithersburg, XP002308290 [Online: URL:http://www.bfrl.nist.gov/861/CMAG/publications/NISTIR_7078_TINreport_final.pdf] Retrieved Nov. 26, 2004.

* cited by examiner

METHOD FOR CONTROLLING A SURFACE-MODIFYING MACHINE

The invention relates to a method for controlling a surface-modifying machine according to the preamble of claim 1 and a computer program product as claimed in claim 12.

A multiplicity of surface-modifying machines, devices or methods are used for preparing surfaces, the term "construction machine" being used below without limitation to a special machine type. Such machines are understood as meaning all devices for direct—e.g. by leveling—or indirect—e.g. by blasting—preparation or forming of surfaces or topographies. The method according to the invention relates in principle to the preparation or modification of any desired surfaces, also within enclosed spaces, such as, for example, in underground mining or in tunnel construction. The modification of surfaces can be effected by removal and filling, but also by further suitable methods, such as, for example, blasting, drilling or hydraulic methods. It is desired to achieve the desired condition to be achieved as the end result of the work while complying with economic and technical criteria.

One approach for such methods is the control of a construction machine by specification of a desired model of the surface to be modified, with respect to which model a difference which serves as a basis for the control commands is continuously or discretely derived. Such a desired model is as a rule provided as a result of CAD procedure in electronic form.

If the machine knows its actual location and the difference between desired and actual conditions at its current position or the next or subsequent working area, an appropriately optimized control for reducing this difference can be effected.

U.S. Pat. No. 5,631,658 discloses, for example, a device and a method for controlling an earthworking machine, in which 2 three-dimensional models are stored. The first model describes the desired condition of a surface to be prepared, whereas the second model maps the actual condition. The second model is continuously updated by determining the three-dimensional position of the construction machine. From the position of the construction machine and/or its tools, conclusions can be drawn about the topography of the surface to be prepared. The construction machine is controlled by evaluating the difference between first and second model, it being intended to reduce this difference.

This approach therefore uses two fundamentally similar models for representing desired and actual condition of the building site, between which an existing difference is to be reduced. The two models have a two-dimensional arrangement of discrete positions to which a vertical value is assigned as a height so that there is a 1-1 relationship between vertical size and horizontal position. For the actual model, the recording is made by the determination of the construction machine itself.

Such models have a plurality of disadvantages. Firstly the actual model must be designed so that this model can be updated by determining the position of the construction machine. This prevents in particular any non-contact measurement or the recording of a deformable region or regions whose load-bearing capacity is too low to enable a machine to travel over it. Although in certain circumstances such regions cannot be prepared by a construction machine, the actual surface contour thereof is in certain circumstances nevertheless important, for example if a section to be prepared by the machine is to be adapted to a flowable—and hence unstable—surface.

Moreover, there are difficulties with the provision of the original second model. Since, in the prior art, the second model has to be updated by the position of the construction machine, for example, other geodetic information, such as, for example, by scanning survey, cannot be used without prior transformation. In particular, no update of such scanned information can be effected by the construction machine using the methods to date.

WO 01/04576 discloses a method for controlling an earth-moving machine, in which the actual condition is obtained by scanning the surface with a scanner. For controlling the construction machine, the height values of individual points of the point cloud thus obtained are compared with corresponding desired values of a model of the desired condition and control commands are derived from the difference obtained.

This approach uses a point cloud for representing the actual conditions, but the derivation of the control commands is effected by the selection and a subsequent comparison of isolated points, it being necessary to assign points of the distribution describing the actual and the desired condition. Moreover, there is no updating of the point cloud during the preparation process.

In both approaches of the prior art the information content of the model or of the point cloud is reduced with regard to the utilization by the one-one relationship since a variation in the surface takes place only with the resolution of the discrete horizontal positioning. Finer structures or variations in the height are not taken into account in the derivation of control commands. In the case of highly structured surfaces, such as, for example, grass or forest landscape, this can lead to fundamental problems since either the plane of the ground or the tip of the growth has to be coordinated with each position. The respective other information is lost in such an approach of the prior art. Moreover, the often very jagged rocky surfaces cannot be determined. Thus, the approach of the prior art does not permit utilization of information beyond the statement of a height which only partly corresponds to the circumstances or is determined with a certain randomness.

An object of the present invention is to provide a method which permits the use of non-differentiated information with respect to the actual condition of the surface to be prepared, i.e. information which is not converted into an explicit model of the surface or a corresponding association of individual points of desired and actual model.

A further object of the present invention is to permit an updating of such an information base or database.

A further object of the present invention is to extend the quantity of usable information, in particular about the surface to be prepared.

A further object of the present invention is the use of information from regions which cannot be directly reached by the construction machine.

These objects are achieved, according to the invention, by embodiments having the features of claim 1 or the features of sub-claims, or these solutions are further developed.

The invention relates to a method for controlling a surface-modifying construction machine or another machine for targeted modification of a surface or of a working volume. The explicit modeling of the actual condition of the surface, in which exactly one vertical quantity is coordinated with each horizontal position, is dispensed with.

For representing the actual condition, a point cloud comprising a multiplicity of points is used, these points each corresponding to a point on the surface considered. Here, a surface is to be understood as meaning a boundary layer relevant for the operation. This also comprises, for example, two or more boundary layers one on top of the other. This may be the case, for example, for a sand surface covered with water. For the operation, it is advantageous if both the water level and the surface of the sand are known here. Overgrown or highly fissured topographies, where it may be advantageous to know both the height of the growth and the surface underneath, constitute a further example.

According to the invention, instead of coordinating respective individual points from the representation of the actual and of the desired condition, a position of the desired model is linked to a plurality of points of the actual condition, it being possible to vary the selection of the points to be linked.

A point cloud describing the actual condition is provided, for example, by an air- or ground-based scanning process, as also described in WO 01/04576 for the case of ground-based recording. In particular, scanning distance-measuring systems, such as, for example, LIDAR (Light Detecting and Ranging) systems are available for this purpose. By means of these systems, a point cloud is generated from distance measurements to the individual surface points. Thus, for example, WO 97/40342 describes a ground-based method which records a topography by scanner systems set up in fixed locations. A fixed setup point which serves as a basis of a scanning process effected by motors is chosen for these systems. The three-dimensional position information of the respective surface point can be derived from the distance to the measured point, the angular position at the time of the measurement and the known location of the scanning device.

Although a three-dimensional model can be derived from a point cloud, as likewise described in WO 97/40342, this, however, leads to a time requirement in combination with loss of information. Thus for example in modeling by the assignment of the respective closest surface point to a spatial point which is used for controlling the machine, a part of the information is dispensed with—in this example the distance between surface point and spatial point.

Updating of the point cloud is possible by a scanning process which may be vehicle-based, for example with respect to the position of the scanner. Either the complete region can be rescanned or only partial regions can be recorded. The fitting of the partial region can be effected, for example, with the use of image processing methods or pattern recognition methods or by surveying the fixed point of the scanner. This makes it possible to carry out the updating without the intermediate step of modeling—in particular in the sense of a 1-1 assignment of horizontal position to height—so that the full information content of the point cloud is retained. Moreover dispensing with the modeling step reduces the required calculation time.

In the method according to the invention, control commands are derived by a comparison between desired condition and the point cloud, where the desired condition can in principle also be represented as a point cloud but as a rule is present as a three-dimensional model. The processing of the surface is effected with a granularity of the operations, with which discrete horizontal positions are coordinated here purely by way of example, it being possible for the resolution to be fixed or variable. For example, a coarser grid can be chosen in flat zones whereas a finer resolution of the horizontal positions is advantageous in the region of steep ascents. Likewise, instead of the discrete horizontal position for specifying the control commands, it is also possible to use a vertical position—for example in tunnel construction—or continuous or pseudo-continuous control can be effected.

For each spatial or horizontal position used, a comparison is made between desired and actual condition. In each case surface points from the point cloud are coordinated with a horizontal position. In the simplest case, some of the spatially closest points are selected and the position information thereof is adopted with aggregation. If this assignment were to be carried out and stored for each horizontal position the stored result would be a three-dimensional model of the actual condition.

In the approach according to the invention, however, advantageously a plurality of surface points from the point cloud are coordinated with a position without there being any loss of information through the intermediate step of modeling. The plurality of points permits derivation of different information for the position considered. One possibility is the calculation of aggregates, for example by means of a weighting function. Thus, for example, the position values of a plurality of surface points can be weighted according to distance from the horizontal position of a grid point used for triggering a control command and are summed so that the height information represents an averaging over a plurality of values. The 1-1 assignment of the prior art is in principle associated with errors or is incomplete in comparison with the method according to the invention since the value recorded in each case for each position may also be an extreme value without corresponding information being available in this context, on the basis of which an evaluation and if necessary a correction can be made.

A further possibility of using a plurality of points consists in the generation of straight lines or planes, for example by the least squares method. In contrast to methods of the prior art local slopes or higher derivatives can thus also be obtained for a position considered. A multiplicity of methods known per se from the area of optimization, pattern recognition or image processing is available for using the information of a plurality of points in a manner possible according to the invention. Thus, planes can also be determined with the aid of the theory of fuzzy logic, neuronal networks or heuristic approaches. For example, by a pattern recognition using neuronal networks, it is possible to recognize a surface form in the point cloud, the preparation plan of which is determined by means of heuristic methods. For example, information about the nature of the ground or of the material, the water content or the surface roughness can be used in these heuristic methods. The control instructions of the machine are therefore effected no longer on the basis of a local comparison between desired height and actual height but with the use of the full information of a scanned surface, it also being possible in particular to use intelligent methods which dispense with modeling. The processes implemented by the control instructions generally relate here to modifications of surfaces with any desired orientation. In particular, this relates to the leveling of areas of ground, excavation of pits, shaping of slopes, but other examples are machine-supported blasting operations, as are used, for example, in opencast mining or underground mining. The control instructions can be converted directly electronically or mechanically but, for example, also lead to interaction with the user. Thus, a control instruction according to the invention also contains, for example, the visual projection of the position of the blast holes, which are subsequently drilled.

The assignment of surface points to the special case of horizontal positions may comprise a separation of the point cloud or overlapping and hence common use of points for a plurality of positions. Thus, for example, a smoothing of the surface can be achieved if the number of surface points which is coordinated with each position exceeds the mean value of the surface points which can be coordinated with each position. The information of the points of neighboring positions is now used for each position.

The option of being able to derive a plurality of possible height levels from the height scatter of points is also available for a position. Thus, a differentiation of growth and soil or the surface of a body of water and the bottom of a body of water can be determined from the scatter of measured surface points.

A further possibility consists in interpretation of the height scatters as a function of time. Thus, height differences may also result from movements of the same object within the time span of a scanning process or between two successive scanning processes. Thus, conclusions can be drawn about the surface from the height scatter.

Additional information of the point cloud can also be used here if, for example, the point cloud is composed of distinguishable subsets of surface points. This is the case in particular if a characteristic quantity is coordinated with the respective subsets, said quantity existing, for example, in a different spectral range of the recording. Thus, two measurements in different spectral ranges can be characterized on storage. On the basis of the different reflection behavior of objects, a simple assignment, for example to one or more possible levels, can now be made. Furthermore, a time-related differentiation may be advantageous if, for example, the same topography is recorded quickly in succession and stored with integration in a common point cloud with characterization of the time of recording. On the basis of the time mark, the subsets can now be separated for each position, which, for example, facilitates the identification and assignment to moving elements. These may be, for example, leaves or liquid surfaces moved by the wind, so that, for example, separation of the Earth's surface and growth is facilitated on the basis of the time signature.

The height scatter can also be used in a targeted manner for fine control of the preparation process. Thus, for a heap of flowable material, it is possible to derive a cutting edge whose height permits simultaneous removal of elevations and filling of depressions.

According to the invention, the use of one of the approaches is not to be automatically applied to the entire region to be prepared. Rather, an approach varying in each case can be adopted for individual zones or individual positions. Thus, for example, a determination of slopes at the respective positions can be dispensed with in flat zones, whereas the slope or the derivative thereof is always calculated for each position in highly ascending or varying zones.

The method according to the invention can also be used for non-continuous processes of surface modification. Such processes consist of operations which are separated or staggered with respect to time, such as, for example, in the sequences excavation—measurement—comparison or drilling—blasting—measurement—comparison.

The recording of a point cloud is possible with scanning methods by various systems. In general, laser scanners which are employed in a ground- or air-based manner are used. In the case of a ground-based system, the recording is made from one or more fixed positions. These positions may be known or unknown. In the case of an air-based system, the position changes continuously, but the scanned surface points are continuously linked with points of a known three-dimensional position. Thus, in both cases, at least a reference point with known absolute position is present, relative to which a reference for all measured surface points and hence their spatial assignment is possible. Thus, the spatial order within the point cloud is determined.

In a point cloud, the number of surface points thus recorded is greater than the number recorded of positions from which control commands are derived, the distribution of the surface points being non-homogeneous with respect to the positions, owing to the recording process. Depending on the geometrical conditions of the scanning process, the densities of the surface points vary and, in partial regions, for example in regions screened from the scanning system, may also be lower than the number of spatial positions. On average, the number of surface points is generally very much greater than the number of required or specified spatial positions.

In order to obtain an update of the prepared region, for example, a periodic or event-controlled scanning process can be effected by an advantageously placed scanner, with the result that the database used, for example, jointly by a plurality of construction machines is updated. Alternatively or in addition, a scanner, for example a line scanner, can also be mounted on the construction machine itself so that the section prepared in each case is determined by the machine itself. The use of a point cloud now offers the possibility of fitting the region determined in each case into the entire point cloud by means of pattern recognition methods. Thus, clearly identifiable structures, such as, for example, road edges, embankments, lines, tracks, etc., can advantageously be used as reference structures. In contrast to the use of a model, it is now not necessary to determine the absolute bearing or position of a surface point. The ensemble of recorded surface points is fitted as a whole into the point cloud. In order to reduce or to eliminate any resulting inconsistencies, a complete scanning process for the entire building site or surface can be carried out periodically.

Here, the method according to the invention enables the use of data and the updating thereof without limitation to surfaces which can be directly prepared or traveled over by the machine. Since updating does not require the positioning of the construction machine on the respective point to be determined, structures or surfaces located outside the region which can be traveled upon can also be used and updated.

A method according to the invention is described in more detail below, purely by way of example, with reference to working examples shown schematically in the drawing. Specifically.

Figure 1:
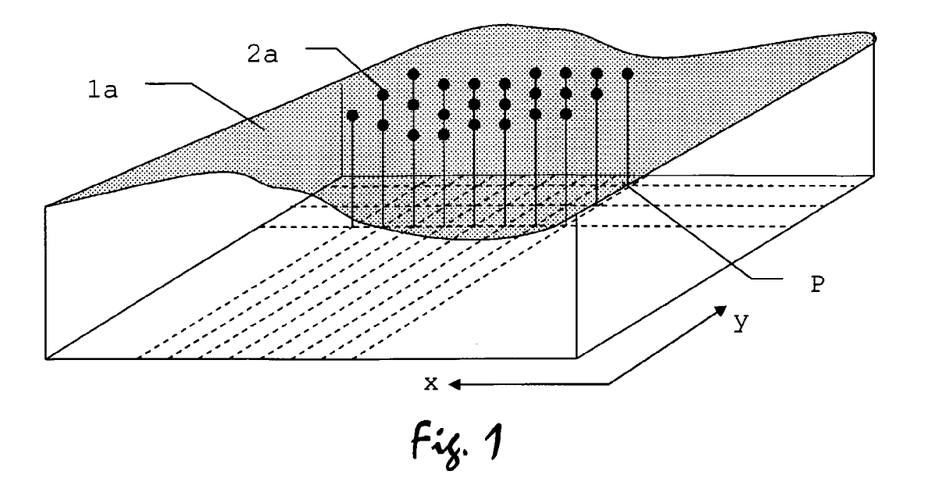
FIG. 1 shows the diagram of a model for imaging the actual condition according to the prior art.

FIG. 1 shows a model for imaging the actual condition 1a according to the prior art. The surface of ground to be prepared is described in the actual condition 1a by a model comprising a multiplicity of first points 2a which each contain height information and are coordinated with a horizontal position P. Thus, the surface in the actual condition 1a is represented by a grid of height information, the height value being specified for each grid point. In an analogous manner, the desired condition can also be represented as a model.

Figure 2:
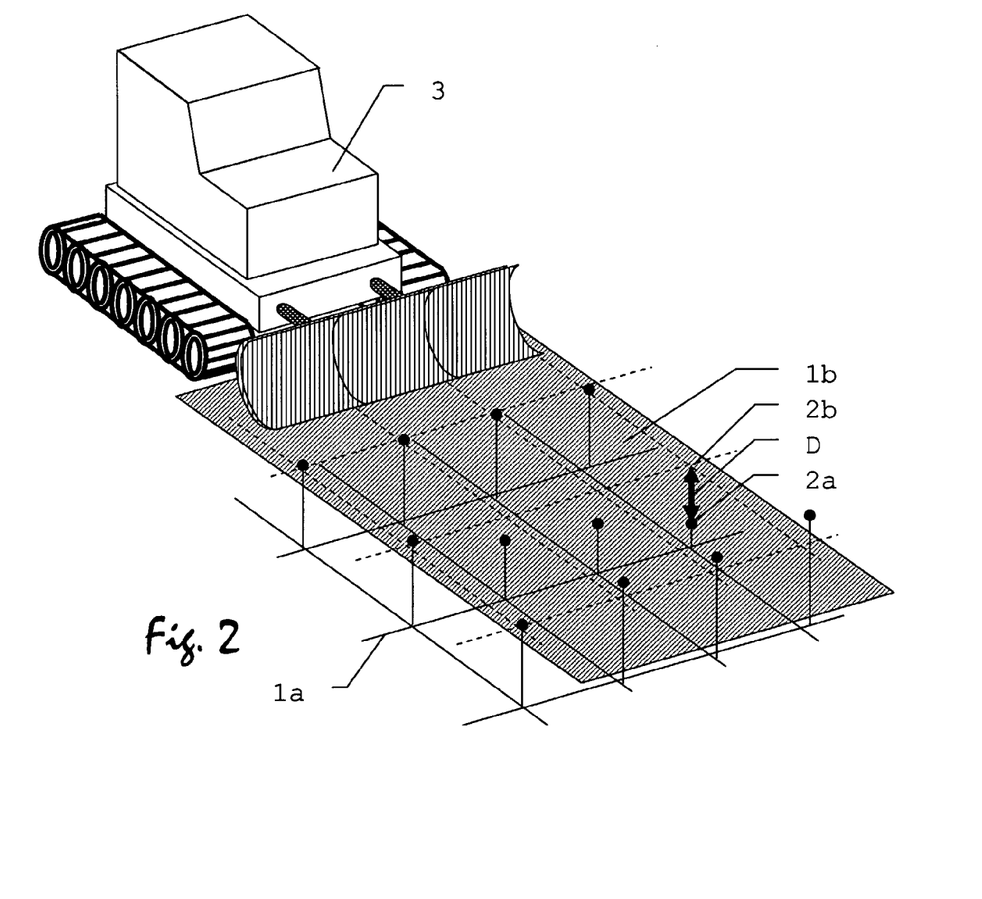
FIG. 2 shows the diagram of the derivation of control commands according to the prior art.

FIG. 2 explains the derivation of control commands according to a method of the prior art. In this example, a construction machine 3 is used for leveling an area of ground. The desired condition 1b is therefore a plane which is shown here shaded and is described by grid nodes as second points 2b. The actual condition 1a is described by first points 2a arranged in the form of a grid, a grid of the horizontal positions of actual condition 1a and desired condition 2a coinciding. The local control command for the construction command 3 is derived from the difference D of the first point 2a and second point 2b. In the example considered here, it follows from this difference D that the filling of a depression must take place at the assigned position.

Figure 3:
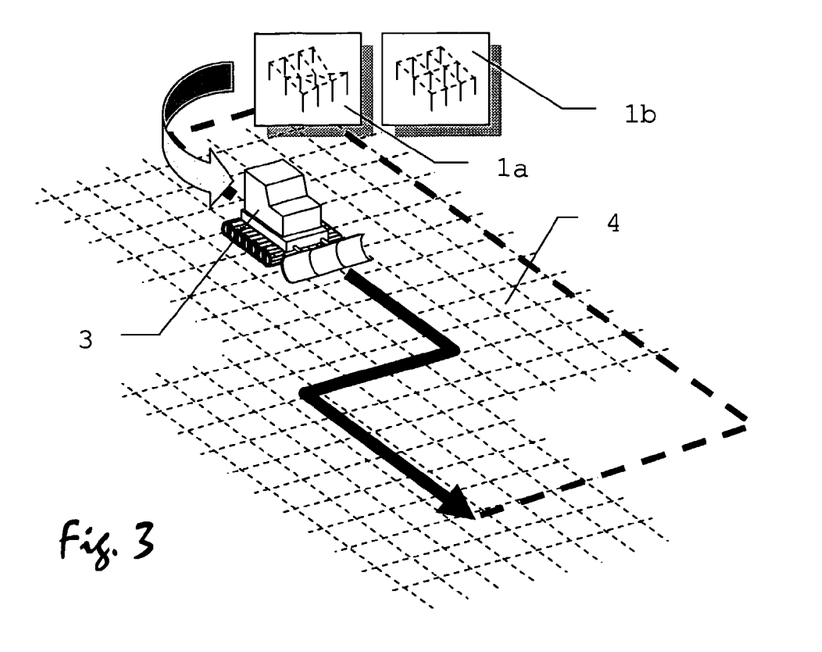
FIG. 3 shows the diagram of a method for surface preparation according to the prior art.

The total sequence of a method for surface preparation according to the prior art is explained schematically in FIG. 3. The construction machine 3 travels in a plurality of passes over the surface 4 to be prepared, said surface being prepared on the basis of the models of actual condition 1a and desired condition 1b. During operation of the construction machine 3, the position thereof is continuously determined and is used for updating the model of the actual condition 1a. A computer compares the two models and generates the control commands on the basis of the differences. Updating thereof necessitates the positioning of the construction machine 3 on the point to be updated. After a certain number of passes or preparation cycles, the difference between the models of actual condition 1a and desired condition 1b has either vanished or has fallen below a specified threshold, so that the operation can be considered to have been completed. In such methods, for example, it is not possible to use actual information of regions which cannot be traveled over or have not been traveled over for controlling the construction machine 3.

Figures 4A, 4B, 4C, 4D:
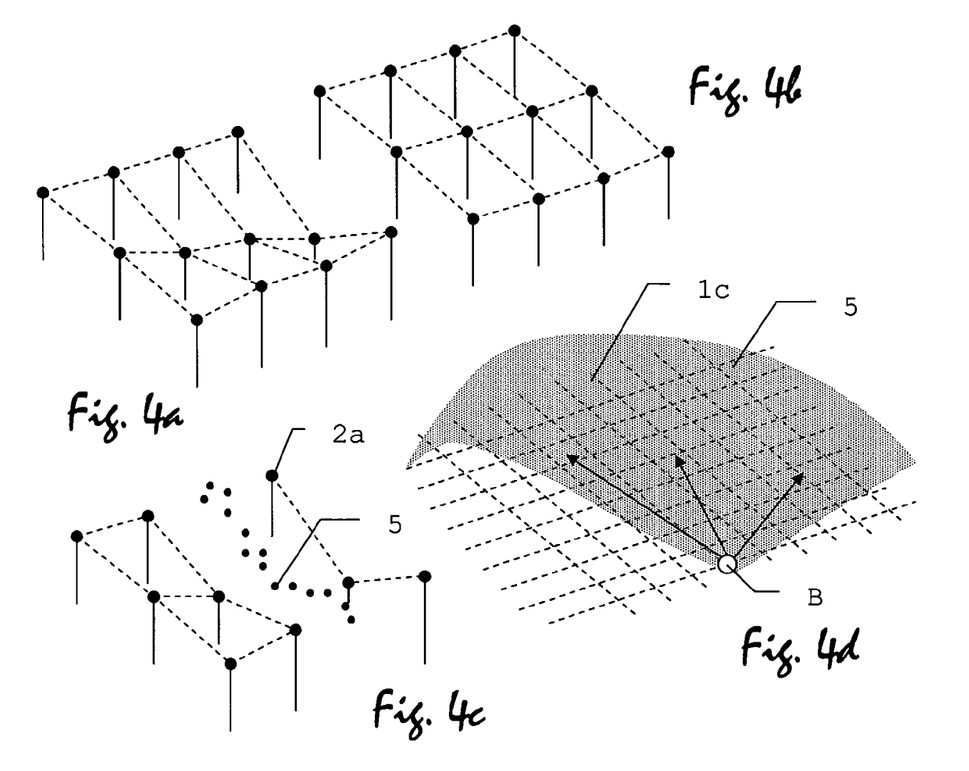
FIG. 4a-d show the diagram of the different representations of actual and desired condition.

FIG. 4a-d show the diagram of the different representations of actual and desired condition. FIG. 4a shows a model of the actual condition comprising height information arranged in the form of a grid, with which model a model of the desired condition having the same composition and shown in FIG. 4b is coordinated. For each point of the underlying grid, there is a possibility for comparison so that a control command can be derived from a resultant difference. In FIG. 4c, the replacement of first points 2a by a multiplicity of surface points 5 is schematically visualized, it being possible to obtain the surface points 5, for example, by an optical scanning process, such as, for example, LIDAR or photogrammetric methods. If the entire surface to be represented is now replaced by surface points 5, the point cloud 1c shown schematically in FIG. 4d follows. In methods of the prior art, individual surface points 5 are compared with individual points of the desired model and control commands are derived from the height difference. According to the invention, the individual surface points 5 are not explicitly coordinated with the individual grid positions which serve for deriving the control commands but have, in the arrangement, a spatial relationship which is given, for example, by the fixed point B of the scanning process. In this example, the horizontal and vertical angles and the distance to the fixed point B are known for each surface point 5 so that, with a knowledge of the absolute position of the fixed point B, it is also possible to determine the respective position of the surface point 5. According to the invention, it is possible for each grid point to use a subset of the point cloud 1c to obtain information for deriving control commands. In contrast to the models of FIG. 4a and FIG. 4b, the information content of the point cloud 1c is not reduced by modeling, so that the actual condition is described with respect to the horizontal position discretely on the basis of a grid, but a number of surface points which on average over all horizontal positions may be greater than 1 or as a rule will be greater than 1 is coordinated with each horizontal position.

The models and coordinate systems used according to the invention are not limited to Cartesian representations. Rather, it is possible in principle to use all suitable representations, the chosen coordinate system frequently depending on the geometry of the surface to be prepared. Thus, representations in polar coordinates are possible for tunnel construction.

Figure 5:
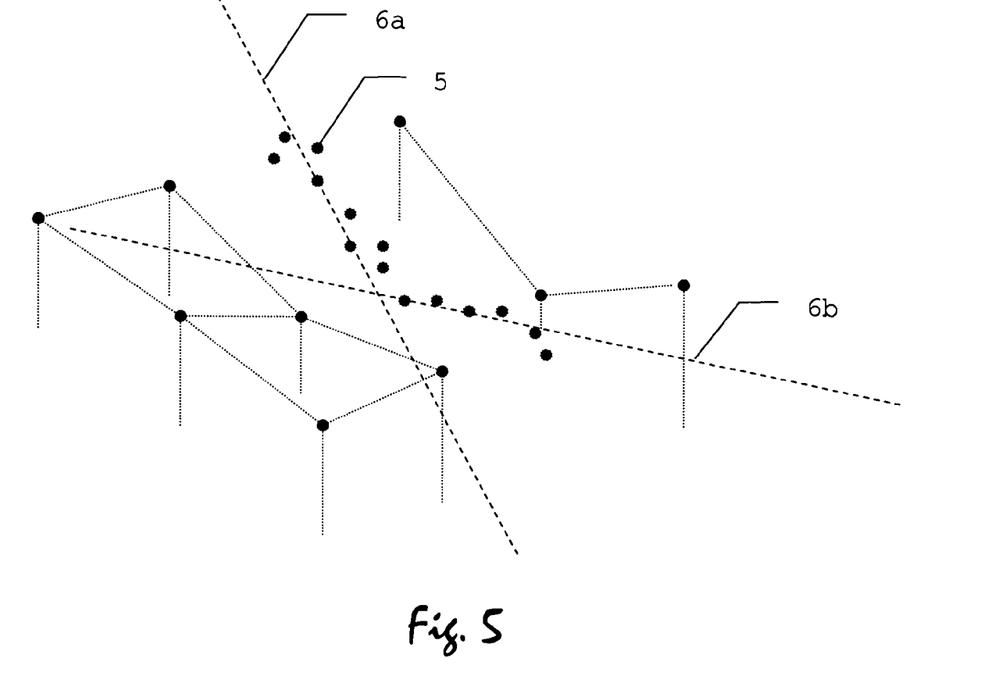
FIG. 5 shows the schematic diagram of the derivation of information from a plurality of assigned surface points for a method according to the invention.

FIG. 5 shows schematically the derivation of information from a plurality of assigned surface points 5 for a method according to the invention, points of a model of the prior art also being shown purely for illustration. In order to fill or to remove a depression or elevation, respectively, in a surface to be prepared, only the height difference between desired and actual conditions and, if appropriate, also relative to adjacent grid points is considered in models of the prior art, in each case a comparison of the spatial difference—in this case height difference—being made between individual points. In a method according to the invention, a curve or area can be laid through the multiplicity of surface points 5, which curve or area permits a better approximation to the surface and hence an optimized derivation of modification information, from which control commands can be generated. Such areas or curves can be derived using a multiplicity of known methods and in particular also taking into account derivatives. In FIG. 5, the insertion of a first straight line 6a and of a second straight line 6b into the surface points 5 of a subset of a point cloud is shown purely by way of example. This generation of a curve or straight line can be effected, for example, by the least squares method, further suitable methods also being, for example, the fuzzy logic method, the image processing method or pattern recognition and various heuristic methods.

Figure 6:
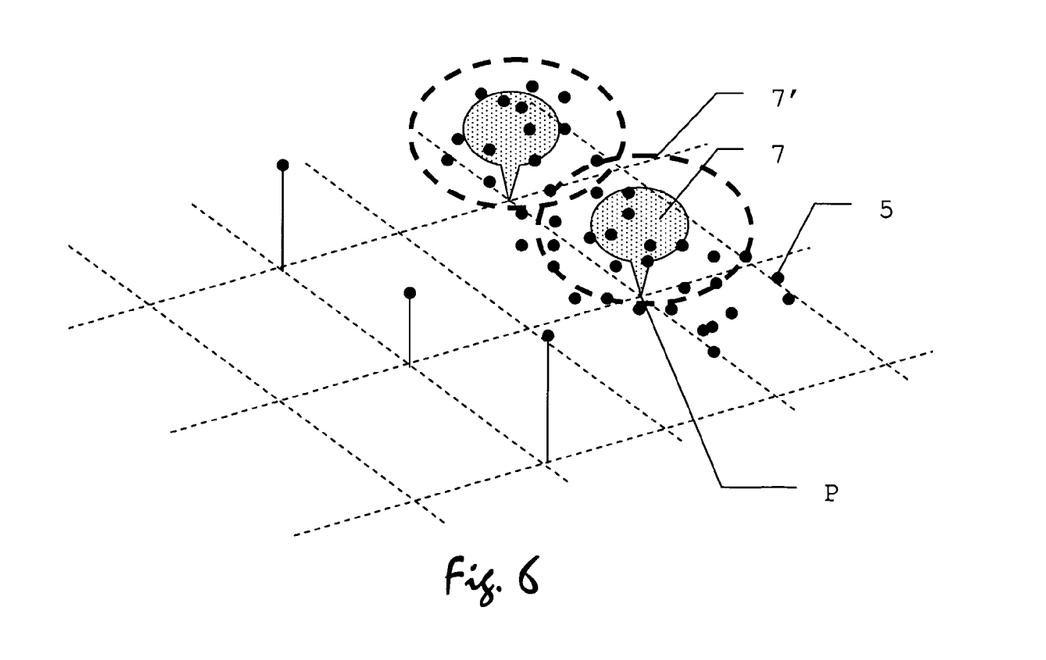
FIG. 6 shows the schematic diagram of the variable assignment of surface points for a method according to the invention.

A relevant step in this approach is generally the selection of the suitable surface points 5, which can be effected by a simple selection method, for example by taking into account surface points 5 closest with respect to a horizontal position, or by pattern recognition. Here, for example, all surface points 5 which belong to a recognized structure are used for deriving areas. FIG. 6, on the other hand, shows the schematic diagram of the variable assignment of surface points for a method according to the invention. All surface points 5 which are present within a specified radius of the position P are coordinated with each position P of the underlying grid of horizontal positions. Thus, the relevant catchment area 7 determines a subset of the point cloud. For example, the surface points 5 thus included and hence coordinated with the horizontal position can be aggregated, in particular by using a weighting function, so that, for example, a mean value is coordinated with the position. The catchment area 7 can be chosen so that the sum of all subsets is smaller than the total point cloud. Alternatively, it is also possible to choose larger catchment areas 7' which result in an overlap with adjacent positions P so that some surface points 5 are included simultaneously in a plurality of subsets. Consequently, surface points of at least two horizontal positions of the actual condition are used for each horizontal position of the desired condition. The quantity of surface points 5 to be used per position may also be variable and dependent on the respective surface structure.

Figure 7:
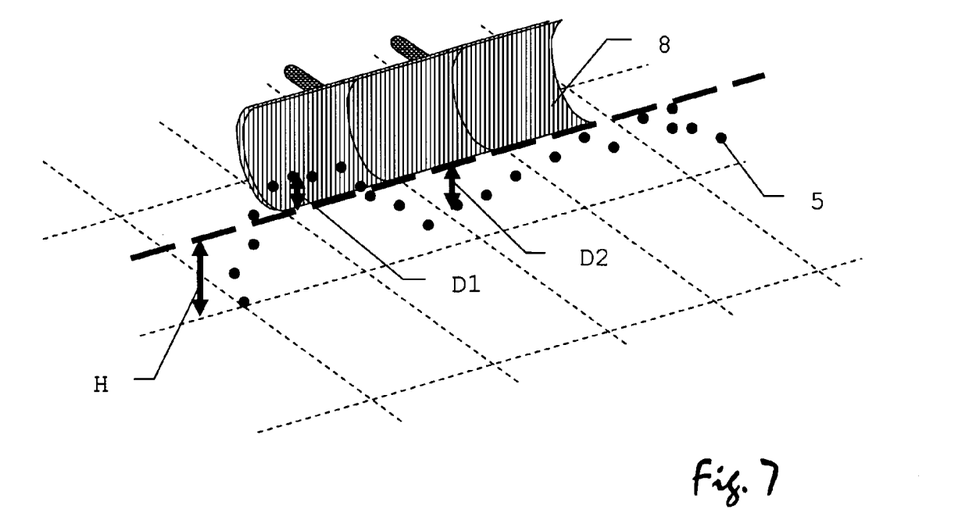
FIG. 7 shows the schematic diagram of the derivation of control commands for a method according to the invention.

FIG. 7 shows the schematic diagram of the derivation of control commands for a method according to the invention, a heap of flowable material which is represented in cross-section by a trace of surface points 5 being considered in this example from civil engineering. The multiplicity of surface points 5 of a point cloud permits a higher resolution of the contour of the surface in comparison with the method of the prior art, which moreover, in the case of this type of deformable surface, cannot in principle be traveled over by the construction machine without deformation and hence cannot be determined. Moreover, in the method according to the invention, the granularity of the material and hence the achievable removal of heights D1 and filling of depressions D2 can be derived from the height scatter of the surface points 5. The system implemented on the construction machine can now derive, from the point cloud or the trace, an optimized height H of the cutting edge for a blade 8 used for preparing the surface, so that the number of required preparation passes is reduced in comparison with methods of the prior art.

Figure 8:
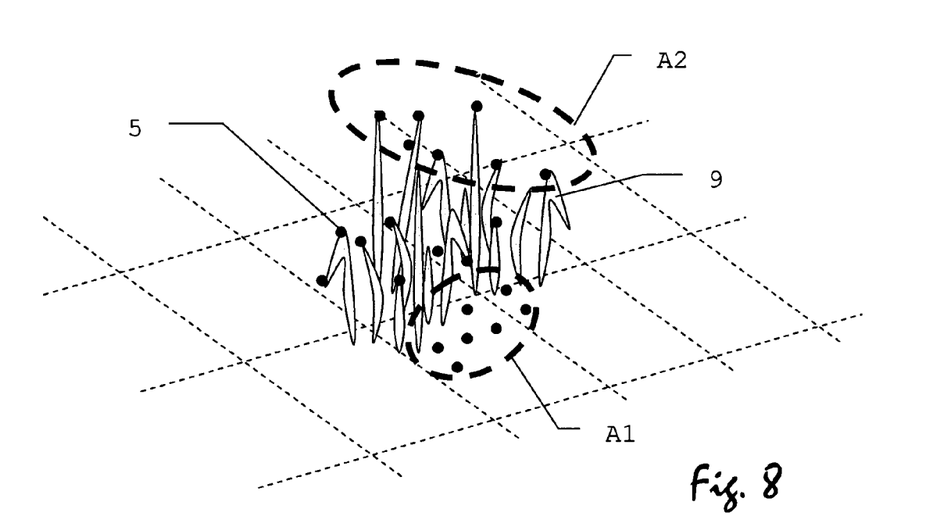
FIG. 8 shows the schematic diagram of the derivation of different planes from the height scatter of a plurality of assigned surface points for a method according to the invention.

A further example of the use of the unreduced information content of the point cloud is shown in FIG. 8 by a schematic diagram of the derivation of different planes from the height scatter of a plurality of assigned surface points 5. If an area to be prepared or to be used in the preparation is overgrown with plants 9, the scanning process generally gives a quantity of surface points 5 which originate from reflections both from the ground and from the plants 9, in particular from the tips thereof. From the surface points 5 of a point cloud, it is possible, for example, to select two subsets, a first subset A1 comprising measurements to the ground and a subset A2 comprising measurements to the tips of the plants 9. The ground or the upper limit of the growth can then be derived from the two subsets. Through this approach, for example, it is possible to obtain the ground of an overgrown and inaccessible region in which equalization of level or of a slope is to be effected. The control commands for the construction machine are thus derived on the basis of a knowledge of the ground contour of an overgrown region. In addition to the separation of surface points on the basis of the height scatter or of the height values, an additional characterizing quantity can be introduced as early as during the recording of the point cloud, so that a separation of the point cloud into subsets is possible on the basis of this quantity. Examples of this are scans or scanning processes which are made at different times or in different spectral ranges and for which time or spectral range serves as a characterizing quantity. Thus, for example, surface points 5 to be coordinated with plants can subsequently be separated on the basis of their spectrally different behavior compared with the ground. Each surface point 5 can additionally be attributed by using this characteristic quantity.

Figure 9:
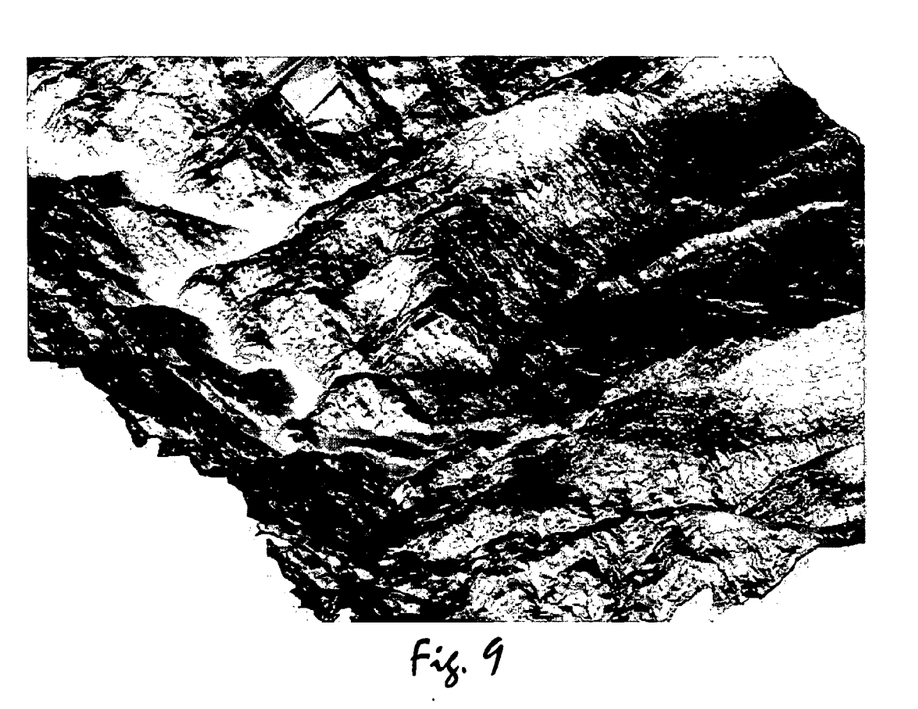
FIG. 9 shows the diagram of an example of a point cloud recorded by air-based means.

FIG. 9 shows the diagram of an example of a point cloud recorded by air-based means. For this purpose, the surface to be prepared is flown over by an aircraft and scanned by means of LIDAR. The point cloud thus recorded can then be used as an initial actual condition. The subsequent updates can be effected either by further flights or by preparing or supporting devices on the ground. The updates obtained in this manner by ground-based means will generally relate only to sections of the point cloud so that fitting in to the total point cloud is necessary. Such a fit can be effected, for example, by pattern recognition or directly with a knowledge of the absolute position or of the relative position of each surface point with respect to a reference point.

Figure 10:
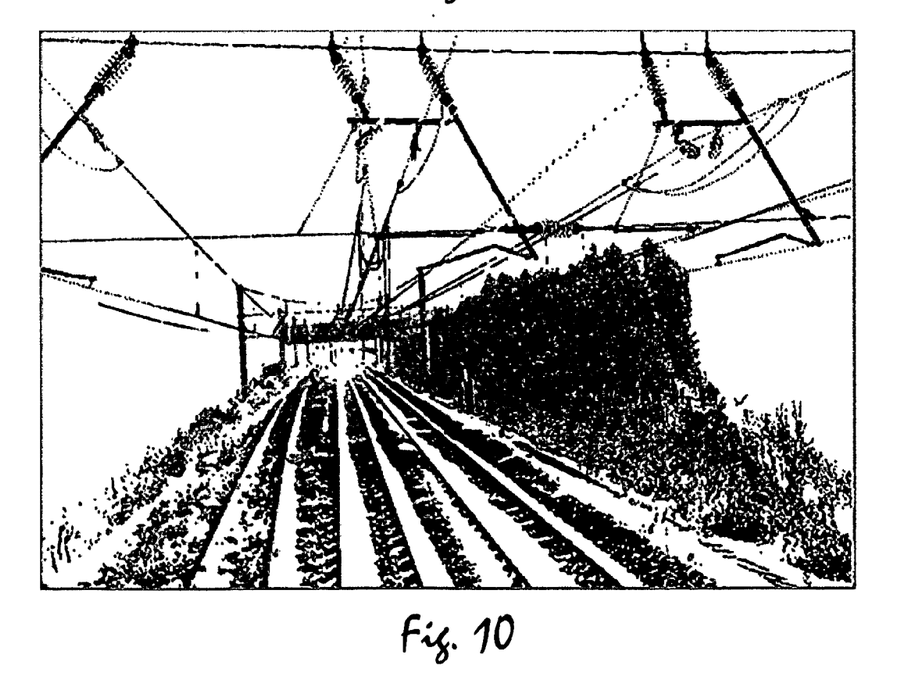
FIG. 10 shows the diagram of a first example of a point cloud recorded by ground-based means.

FIG. 10 shows a first example of a point cloud recorded by ground-supported means. The view covers a railway track having a plurality of rails and associated overhead lines. In the right region, strong growth is recognizable. Owing to the circumstances, determination of the ground under the track or under the growth would not be possible by methods of the prior art since the construction machine cannot be positioned directly on the ground under the tracks or the growth. Moreover, direct and constant contact with the surface is frequently forbidden, for example for safety reasons.

Figure 11:
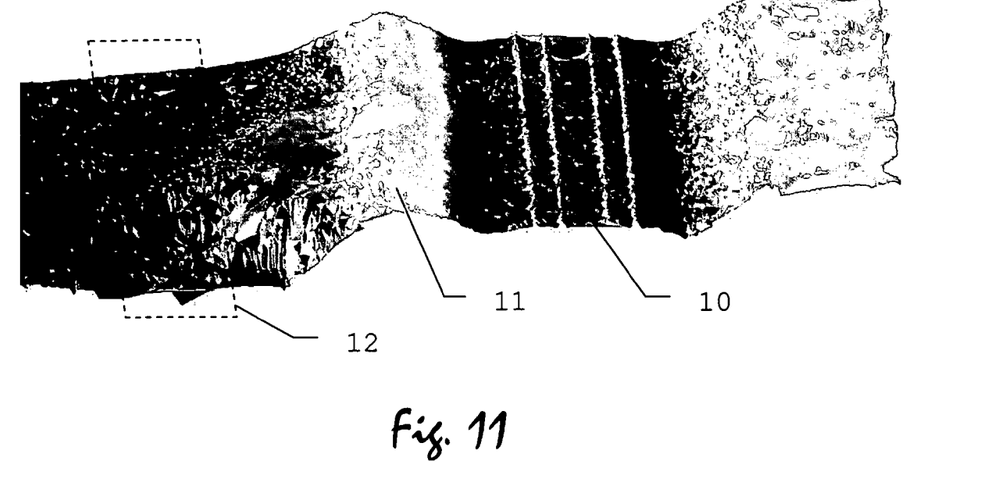
FIG. 11 shows the identifiability of structures in a second example of a point cloud recorded by ground-based means and FIG. 12 shows the diagram of various systems for recording point clouds which can be used according to the invention.

FIG. 11 explains the identifiability of structures and the derivation of control commands in the second example for a point cloud recorded by air-based means. A rail section having a bed 10 and an embankment 11 which borders on the left and is followed by a gently descending, structured terrain is shown. In this example a roadway 12 is to be laid parallel to the rail section, it being intended to match the height of said roadway to the bed 10. Regarding the highest point of the—partly overgrown—embankment 11, a minimum lateral distance must be maintained and the transition from roadway to embankment 11 should be continuously adapted in its slope. The embankment 11 will be refilled or remodeled in some places simultaneously with the laying of the roadway 12. For safety reasons, it is not possible to drive on the railway track and the embankment 11.

In contrast to methods of the prior art, it is possible, on the basis of the recorded point cloud which can also be updated in inaccessible regions, to derive control commands which make it possible to comply with these constraints. Thus, for example, the bed 10 of the railway track can be determined by first excluding from use by means of pattern recognition all surface points which can be coordinated with the railway tracks. Corresponding planes which approximate the bed 10 can then be laid through the remaining subset of the point cloud.

According to the invention, the various approaches for separation of subsets from the point cloud can be combined with one another, in particular with repetition of individual steps. Thus, in FIG. 11, the railway tracks can also be separated on the basis of their spectral reflection behavior due to the metal, or all surface points which lie outside a certain height band are not used in deriving the bed 10. In the same way, the embankment 11 can be separated from the growth present thereon. In particular, the approaches for separation can be applied in a plurality of passes with different separation power or threshold values, so that stepwise selection and separation take place.

Figure 12:
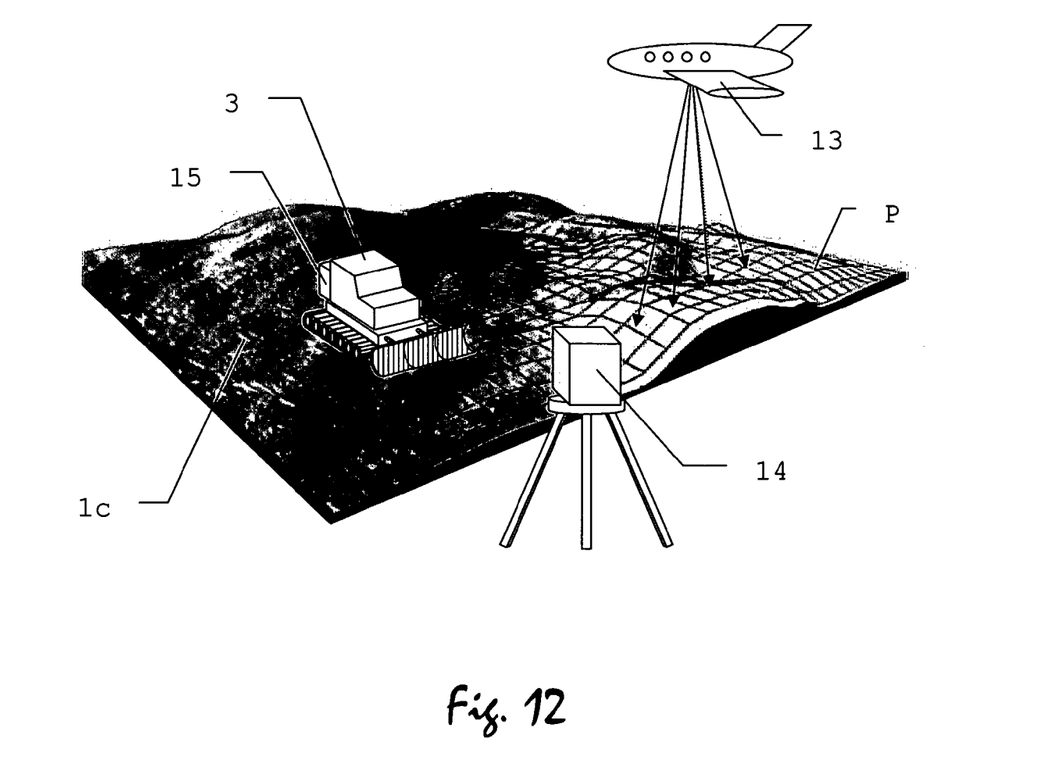

FIG. 12 shows various systems for recording or updating point clouds 1c which can be used according to the invention. For deriving control commands, a surface to be prepared is covered with a grid of horizontal positions P at which a control command is required or desirable. A point cloud 1c which serves as a carrier of information about the actual position is superposed on these horizontal positions P. This point cloud 1c can be recorded or updated by an aircraft 13 or a ground-based scanner 14. If a point cloud 1c which represents the actual condition exists, the updating can also be effected by the preparing devices of the construction machine 3—in particular where modifications are made predominantly by preparation steps. An advantageous solution is to mount a line scanner 15 in the rear region of the construction machine 3, it being possible for the line scanner 15 to scan in the vertical or oblique direction. As a result, the construction machine 3 records the region modified by the construction machine itself and fits said region into the point cloud 1c for updating. In principle, however, the initial point cloud 1c can also be recorded by a construction machine 3 equipped in this manner, by traveling over the entire relevant region and/or moving the line scanner 15 appropriately.

In the figures, the models, point clouds, surfaces and devices used are shown purely schematically. In particular no size relationships or details of the recording, storage and analysis or image processing or pattern recognition are evident from the diagrams. The surface points or points of a model of the prior art which are shown only by way of example also represent more complex structures or a larger number of surface points in a point cloud.

What is claimed is:

1. A method for controlling a surface-modifying machine, the method comprising the acts of:
   providing information about the desired condition of a surface to be prepared;
   providing a point cloud recorded by a distance-measuring scanner system as a spatial distribution of discrete surface points and as information about the actual condition of the surface;
   deriving a control instruction for the machine by comparison of the desired condition and the point cloud; and
   controlling the machine according to the derived control instruction,
   wherein, for a spatial position, the comparison of the desired condition and the point cloud uses at least two surface points of the point cloud together when deriving a single control instruction.

2. The method as claimed in claim 1, wherein the comparison of desired condition and point cloud for each spatial position of the desired condition uses surface points of at least two spatial positions of the actual condition when deriving the control instruction.

3. The method as claimed in claim 1, wherein at least one surface which represents or approximates a possible actual surface of the actual condition is coordinated with the at least two surface points.

4. The method as claimed in claim 3, wherein the assigned surface is derived by at least one of the following methods: least squares method, fuzzy logic method, image processing method, pattern recognition, and heuristic method.

5. The method as claimed in claim 1, wherein, for each spatial position of the actual condition, the spatial difference of at least two assigned surface points is used when deriving the control instruction.

6. The method as claimed in claim 1, wherein the provision of the point cloud includes an update of the point cloud while carrying out the method.

7. The method as claimed in claim 6, wherein the scanning of a prepared surface section is through a LIDAR scan.

8. The method as claimed in claim 6, wherein, on provision of the point cloud, fitting of the prepared surface section into the point cloud is effected by at least one of: image processing methods, pattern recognition methods, and absolute referencing of the scan fixed point.

9. The method as claimed in claim 1, wherein the point cloud is composed of distinguishable subsets of surface points.

10. The method as claimed in claim 1, wherein the point cloud is composed of distinguishable subsets of surface points a characterizing quantity being coordinated with the respective subsets.

11. The method as claimed in claim 1, wherein the number of surface points which is coordinated with the spatial position is variable.

12. The method as claimed in claim 1, wherein the surface points coordinated with a spatial position are aggregated.

13. A computer program product as a record on a non-transitory data medium, the product comprising:
    information provided about the desired condition of a surface to be prepared;
    a point cloud recorded by a distance-measuring scanner system as a spatial distribution of discrete surface points and as information about the actual condition of the surface;
    a control instruction for the machine derived by comparison of desired condition and point cloud; and
    a machine controlled according to the derived control instruction,
    wherein, for a spatial position, the comparison of desired condition and point cloud uses at least two surface points of the point cloud together when a single control instruction is derived.

14. The product as claimed in claim 13, wherein the comparison of desired condition and point cloud for each spatial position of the desired condition uses surface points of at least two spatial positions of the actual condition when deriving the control instruction.

15. The product as claimed in claim 13, wherein at least one surface, or one plane, which represents or approximates a possible actual surface of the actual condition is coordinated with the at least two surface points.

16. The product as claimed in claim 15, wherein the assigned surface is derived by at least one of the following methods: least squares method, fuzzy logic method, image processing method, pattern recognition, and heuristic method.

17. The product as claimed in claim 13, wherein, for each spatial position of the actual condition, the spatial difference, or height difference, of at least two assigned surface points is used when deriving the control instruction.

18. The product as claimed in claim 13, wherein the provision of the point cloud includes an update of the point cloud while carrying out the method by scanning of a prepared surface section.

19. The product as claimed in claim 18, wherein the scanning of a prepared surface section is through a LIDAR scan.

20. The product as claimed in claim 18, wherein, on provision of the point cloud, fitting of the prepared surface section into the point cloud is effected by at least one of: image processing methods, pattern recognition methods, and absolute referencing of the scan fixed point.

21. The product as claimed in claim 13, wherein the point cloud is composed of distinguishable subsets of surface points a characterizing quantity being coordinated with the respective subsets.

22. The product as claimed in claim 21, wherein the characterizing quantity is at least one of a time mark and a spectral range.

23. The product as claimed in claim 13, wherein the number of surface points which is coordinated with the spatial position is variable as a function of at least one of time and location.

24. The product as claimed in claim 13, wherein the surface points coordinated with a spatial position are aggregated by the use of a weighting function.

25. The method as claimed in claim 1, wherein the at least two surface points of the point cloud are linked with one another, when deriving the control instruction.

26. The method as claimed in claim 1, wherein at least one plane which represents or approximates a possible actual surface of the actual condition is coordinated with the at least two surface points.

27. The method as claimed in claim 1, wherein, for each spatial position of the actual condition, the height difference of at least two assigned surface points is used when deriving the control instruction.

28. The method as claimed in claim 1, wherein the provision of the point cloud includes an update of the point cloud while carrying out the method, in particular by scanning of a prepared surface section.

29. The method as claimed in claim 10, wherein the characterizing quantity is at least one of a time mark and a spectral range.

30. The method as claimed in claim 1, wherein the number of surface points which is coordinated with the spatial position is variable as a function of at least one of time and location.

31. The method as claimed in claim 1, wherein the surface points coordinated with a spatial position are aggregated by the use of a weighting function.

32. The product as claimed in claim 13, wherein, for the spatial position, the comparison of desired condition and point cloud uses at least two surface points of the point cloud by linking said surface points with one another when the control instruction is derived.

* * * * *